United States Patent
Rehs

(10) Patent No.: US 6,501,907 B1
(45) Date of Patent: Dec. 31, 2002

(54) HEATING FACILITY FOR A MOTOR VEHICLE COMPONENT TO BE HEATED

(75) Inventor: Andreas Rehs, Rotenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/449,798

(22) Filed: Nov. 26, 1999

(30) Foreign Application Priority Data

Dec. 1, 1998 (DE) .......................................... 198 55 388

(51) Int. Cl.[7] .................................................. B05B 1/24
(52) U.S. Cl. ........................ 392/473; 392/502; 239/133
(58) Field of Search ................................ 392/473, 465, 392/502; 239/128, 130, 133, 135

(56) References Cited

U.S. PATENT DOCUMENTS 4,088,269 A * 5/1978 Schlick ........................ 239/133

6,220,524 B1 * 4/2001 Tores et al. .................. 239/130

FOREIGN PATENT DOCUMENTS

| DE | 2519902 A1 | * 11/1976 |
| DE | 8105826 | 7/1982 |
| EP | 0123103 A2 | * 10/1984 |
| GB | 2274410 B | * 9/1996 |
| WO | WO 98-52695 | * 11/1998 |

* cited by examiner

Primary Examiner—Teresa Walberg
Assistant Examiner—Thor Campbell
(74) Attorney, Agent, or Firm—Martin A. Farber

(57) ABSTRACT

In a heating facility (6) for a motor vehicle component to be heated, a heating element (12) is held within a receptacle (11) by a sealing compound (13). The receptacle (11) is manufactured from aluminum and can be introduced into a correspondingly formed heating well of the component. As a result, the heating facility (6) can be mounted in a very simple way and used for heating highly diverse components.

10 Claims, 1 Drawing Sheet

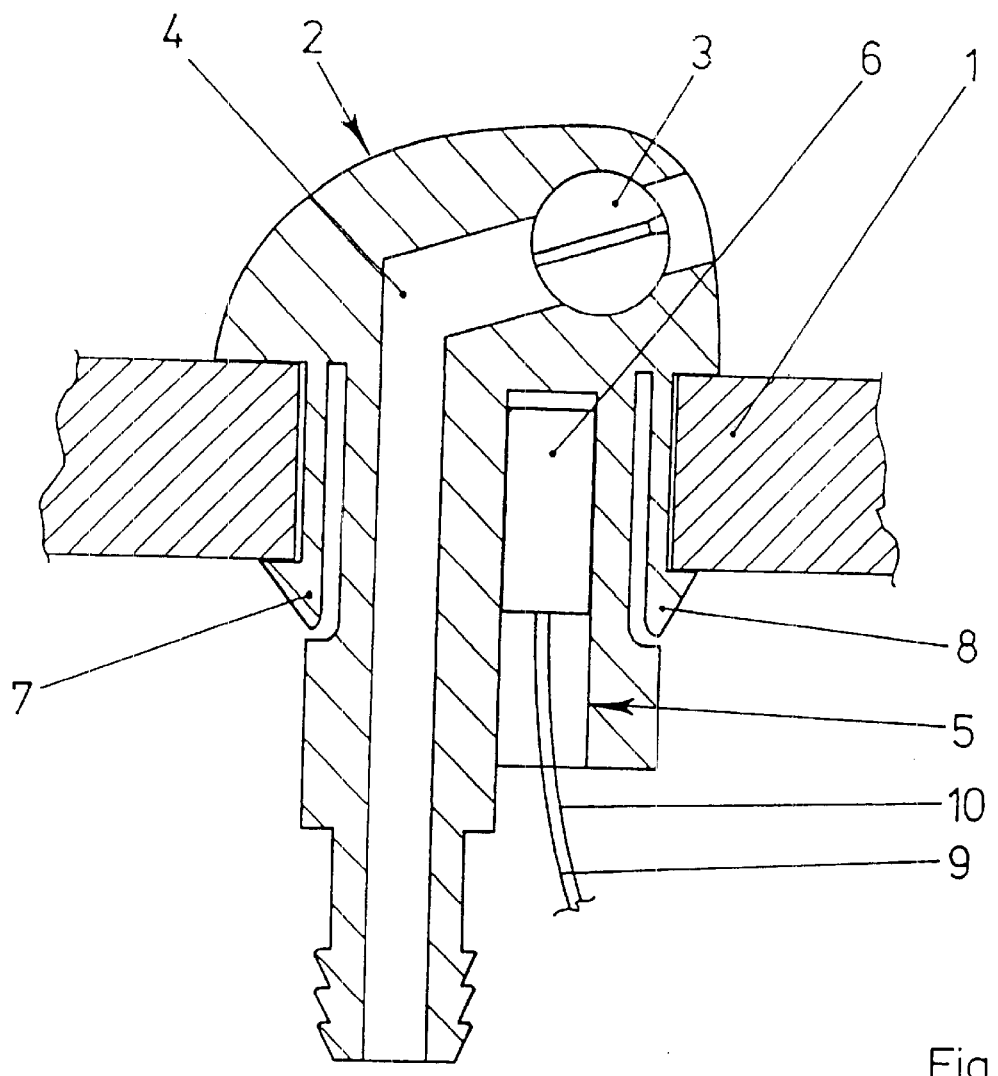
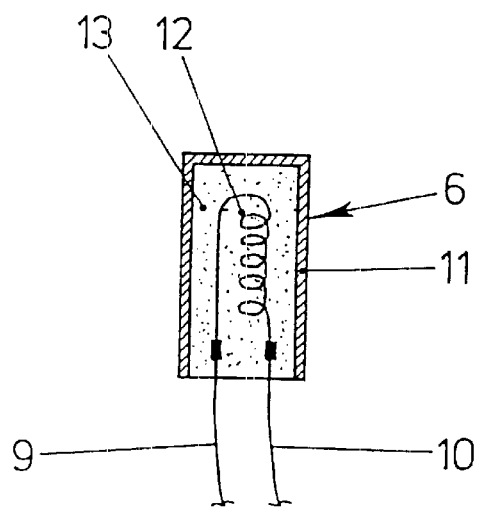
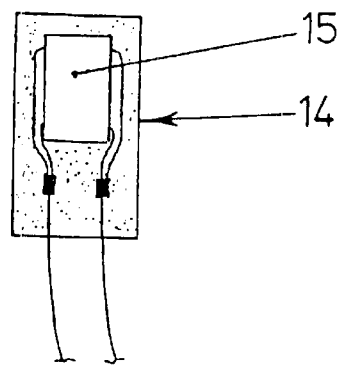

HEATING FACILITY FOR A MOTOR VEHICLE COMPONENT TO BE HEATED

FIELD AND BACKGROUND OF THE INVENTION

The invention relates to a heating facility for a motor vehicle component to be heated, in particular for a valve or a washing nozzle of a shield cleaning system having an electric heating element.

Such heating facilities serve for maintaining the corresponding component at a temperature above 0° C. and are known in practice. In such cases, the heating element is usually fastened directly to the washing nozzle or to the valve of the shield cleaning system. Fastening is usually carried out by inserting the heating element into a recess of the component. The component to be heated and the heating element are subsequently sealed together. For this purpose, it is necessary to design receiving devices for each of the components and to adapt the heating element accordingly. The heating element is designed selectively as a resistance element or as a PTC element. The advantage of designing the heating element as PTC element is that its heating capacity rises with a falling temperature. This makes it possible to control the heating in a particularly simple way.

One disadvantage of the known heating facility is that the fastening of the heating element to the component to be heated is very complicated. Furthermore, the component to be heated is heated by the heating element in only a very small region. A high temperature and therefore a cost-intensive thermally resistant design of the components are necessary for this purpose.

SUMMARY OF THE INVENTION

The problem on which the invention is based is to provide a heating facility of the type initially mentioned, in such a way that it can be mounted in a very simple way and is suitable for heating highly diverse components.

This problem is solved, according to the invention, by arranging the heating element within a receptacle provided for fastening to the component.

By virtue of this heating facility, the heating element forms, with the receptacle, a premountable structural unit which can be produced and tested independently of the component. Direct contact of the heating element with the component to be heated is avoided by arranging the heating element within the receptacle. Since the heating facility according to the invention is provided with a large heat transmission area, damage to the component to be heated, due to local overheating, is ruled out. The heating facility according to the invention is therefore suitable for heating highly diverse and less thermally resistant components. By virtue of the invention, therefore, there is no need for the heating element to be adapted to each of the components. The components to be heated may, for example, be valves and washing nozzles or else a door lock of the motor vehicle. If a particularly high heating capacity is necessary for the corresponding component, a plurality of heating facilities according to the invention can also be fastened to the component. Furthermore, the mounting of the heating facility according to the invention is simplified, since there is no need for it to be sealed together with the component. The receptacle of the heating facility according to the invention can, for example, simply be inserted into a correspondingly designed recess of the component to be heated, and clamped tight, firmly bonded or secured by snapping.

Advantageously, the heating element is a resistance or PTC element.

The heating facility according to the invention can be inserted in a very simple way in a heating well of the component to be heated, if the receptacle is of cylindrical design. Moreover, virtually the entire heating capacity emitted by the heating element is thereby supplied to the component.

The heating facility according to the invention can be manufactured particularly cost-effectively if the heating element is held in the receptacle by means of a sealing compound. Moreover, manufacture can thereby be automated.

According to another advantageous development of the invention, the receptacle is heated particularly uniformly if the receptacle is manufactured from metal. On account of the high thermal conductivity and thermal capacity of the metal, the heating capacity passes particularly uniformly to the component to be heated. Furthermore, the mounting of the heating element in the receptacle thereby becomes particularly simple.

According to another advantageous development of the invention, the receptacle has particularly high thermal conductivity and can be manufactured particularly cost-effectively by the deep-drawing method if the receptacle is manufactured from aluminum.

The heating facility according to the invention is particularly cost-effective if the receptacle is manufactured from plastic. In the simplest case, the receptacle consists of sealing compound.

If the component to be heated consists of plastic, in another advantageous embodiment injection molding is carried out directly around the heating element, in that the heating element is inserted into the injection mold when the component to be heated is being produced.

BRIEF DESCRIPTION OF THE DRAWING

The invention permits numerous embodiments. In order to make its basic principle even clearer, two of these are illustrated in the figures of the drawing and are described below. In the drawing:

FIG. 1 shows a washing nozzle of a shield cleaning system with a heating facility according to the invention;

FIG. 2 shows the heating facility according to the invention from FIG. 1 in longitudinal section;

FIG. 3 shows a further embodiment of the heating facility according to the invention in longitudinal section.

DETAILED DESCRIPTION OF THE PREFERRED EMBODIMENT

FIG. 1 shows a washing nozzle 2 fastened to a body part 1 of a motor vehicle and having a washing fluid duct 4 possessing a nozzle body 3. Next to the washing fluid duct 4, the washing nozzle 2 has a heating well 5, in which a heating facility 6 according to the invention is inserted. The heating facility 6 can be fastened in the heating well 5, for example, by pressing in, adhesive bonding and/or snapping. The washing nozzle 2 is snapped together with the body part 1. For this purpose, the washing nozzle 2 has resilient catch hooks 7, 8. The heating facility 6 is connected to a control device, not illustrated, via two electric leads 9, 10.

FIG. 2 shows the heating facility 6 according to the invention from FIG. 1 in longitudinal section. The heating facility 6 has a pot-shaped receptacle 11 with a cylindrical outer surface. A heating element 12 is fastened in the receptacle 11 by means of a sealing compound 13. The receptacle 11 may, in this case, be manufactured from plastic or aluminum. If the receptacle 11 is manufactured from aluminum, the heating element 12 is insulated by the sealing compound 13. The heating element 12 is designed as a resistance element and heats up as a function of the energy supplied to it.

FIG. 3 shows another embodiment of the heating facility according to the invention, in which a cylindrical receptacle 14 is manufactured from plastic. A heating element 15 comprising as a PTC element is arranged in the upper part of the receptacle 14. The advantage of this development of the heating facility according to the invention is that the manufacture of the receptacle 14 and the fixing of the heating element 15 can be carried out in one operation.

I claim:

1. A heating facility for a motor vehicle component to be heated, in particular for a valve or a washing nozzle of a shield cleaning system, the heating facility comprising a receptacle to be fastened to the component, an electric heating element, wherein the heating element (12, 15) is arranged within said receptacle, and said receptacle comprises thermally conductive material enclosing said heating element for conducting heat from said heating element to a heat transmission area of the receptacle, the heat transmission area supplying heat to the component upon a fastening of the receptacle to the component.

2. The heating facility as claimed in claim 1, wherein said receptacle (11, 14) is of cylindrical design.

3. The heating facility as claimed in claim 1, wherein the heating element (12) is held in the receptacle (11) by means of said material, said material being a sealing compound (13).

4. The heating facility as claimed in claim 1, wherein the receptacle (11) is manufactured from metal.

5. The heating facility as claimed in claim 4, wherein said receptacle (11) is manufactured from aluminum.

6. The heating facility as claimed in claim 1, wherein the receptacle (11, 14) is manufactured from said material, said material being plastic.

7. The heating facility as claimed in claim 6, wherein, upon a fastening of the receptacle in a heating well (5) of the component, the heating element (12) is arranged in the component (2) by injection molding of the material around said heating element.

8. The heating facility as claimed in claim 1, wherein the heating element (12) is a PTC or resistance element.

9. The heating facility as claimed in claim 6, wherein said receptacle is inserted into a heating well in the washing nozzle.

10. The heating facility as claimed in claim 9, wherein the receptacle is fastened within the heating well by one of pressing, adhesive bonding and snaping.

* * * * *